United States Patent
Yang et al.

(10) Patent No.: US 9,979,581 B2
(45) Date of Patent: May 22, 2018

(54) CONTROL CHANNEL DESIGN FOR ELAA

(71) Applicant: MEDIATEK INC., Hsinchu (TW)

(72) Inventors: Weidong Yang, San Diego, CA (US); Chien-Chang Li, Penghu County (TW); Bo-Si Chen, Keelung (TW); Yih-Shen Chen, Hsinchu County (TW)

(73) Assignee: MEDIATEK INC., HsinChu (TW)

( * ) Notice: Subject to any disclaimer, the term of this patent is extended or adjusted under 35 U.S.C. 154(b) by 0 days. days.

(21) Appl. No.: 15/474,125

(22) Filed: Mar. 30, 2017

(65) Prior Publication Data

US 2017/0302493 A1 Oct. 19, 2017

Related U.S. Application Data

(60) Provisional application No. 62/317,462, filed on Apr. 1, 2016, provisional application No. 62/322,313, filed on Apr. 14, 2016.

(51) Int. Cl.
*H04L 5/00* (2006.01)
*H04L 27/26* (2006.01)
(Continued)

(52) U.S. Cl.
CPC ........ *H04L 27/2666* (2013.01); *H04L 1/0029* (2013.01); *H04L 1/0038* (2013.01); *H04L 1/1819* (2013.01); *H04L 1/1822* (2013.01); *H04L 1/1896* (2013.01); *H04L 5/0007* (2013.01); *H04W 48/16* (2013.01);
(Continued)

(58) Field of Classification Search
CPC ... H04L 5/0007; H04L 1/1896; H04L 1/0031; H04L 27/2666

USPC ....... 455/507, 509, 500, 517, 515, 445, 450, 455/452.1, 426.1, 426.2, 422.1, 403,
(Continued)

(56) References Cited

U.S. PATENT DOCUMENTS

| 2013/0336160 A1 | 12/2013 | Yin et al. ................. 370/254 |
| 2014/0204878 A1 | 7/2014 | Jang et al. .................. 370/329 |
| 2016/0278050 A1* | 9/2016 | Nory ................. H04W 16/14 |

FOREIGN PATENT DOCUMENTS

| CN | 102447549 A | 5/2012 |
| CN | 102647248 A | 8/2012 |
| CN | 104348597 A | 2/2015 |

OTHER PUBLICATIONS

International Search Report and Written Opinion of International Search Authority for PCT/CN2017/079199 dated Jun. 23, 2017 (12 pages).

(Continued)

*Primary Examiner* — Keith Ferguson
(74) *Attorney, Agent, or Firm* — Imperium Patent Works; Zheng Jin

(57) ABSTRACT

A flexible and efficient physical downlink control channel (PDCCH) signaling scheme that schedules physical uplink shared channel (PUSCH) transmission over multiple subframes with Hybrid Automatic Retransmission (HARQ) support is proposed. The PDCCH has a downlink control information (DCI) format that schedules PUSCH transmission over multiple subframes. The PUSCH transmission is associated with multiple HARQ processes with non-consecutive HARQ process IDs. Furthermore, the DCI format uses joint signaling to combine HARQ process indexes, new data indication (NDI), and redundancy version (RV) to reduce signaling overhead.

21 Claims, 4 Drawing Sheets

(51) Int. Cl.
  *H04L 1/00*    (2006.01)
  *H04W 48/16*   (2009.01)
  *H04W 72/04*   (2009.01)
  *H04L 1/18*    (2006.01)

(52) U.S. Cl.
  CPC ... *H04W 72/0413* (2013.01); *H04W 72/0473* (2013.01); *H04L 1/0031* (2013.01)

(58) Field of Classification Search
  USPC ......... 455/550.1, 522, 69, 68; 370/310, 329, 370/328, 281, 343, 295
  See application file for complete search history.

(56) References Cited

OTHER PUBLICATIONS

3GPP TSG RAN WG1 #74bis R1-134168, Samsung, Specification support for FDD-TDD CA, Guangzhou, China dated Oct. 7-11, 2013 (3 pages).
3GPP TSG RAN Meeting #70 RP-152272, Eriicsson et al., New Work Item on Enhanced LAA for LTE, Sitges, Spain dated Dec. 7-10, 2015 (8 pages).
ETSI EN 301 893 v1.8,0, "Broadband Radio Access Networks (BRAN); 5 GHz high performance RLAN; Harmonized EN covering the essential requirements of article 3.2 of the R&TTE Directive", (93 pages).
3GPP TSG RAN WG1 #81 R1-152790, Qualcomm Incorporated, Uplink Waveform for LAA, Fukuoka, Japan dated Apr. 25-29, 2015 (4 pages).

\* cited by examiner

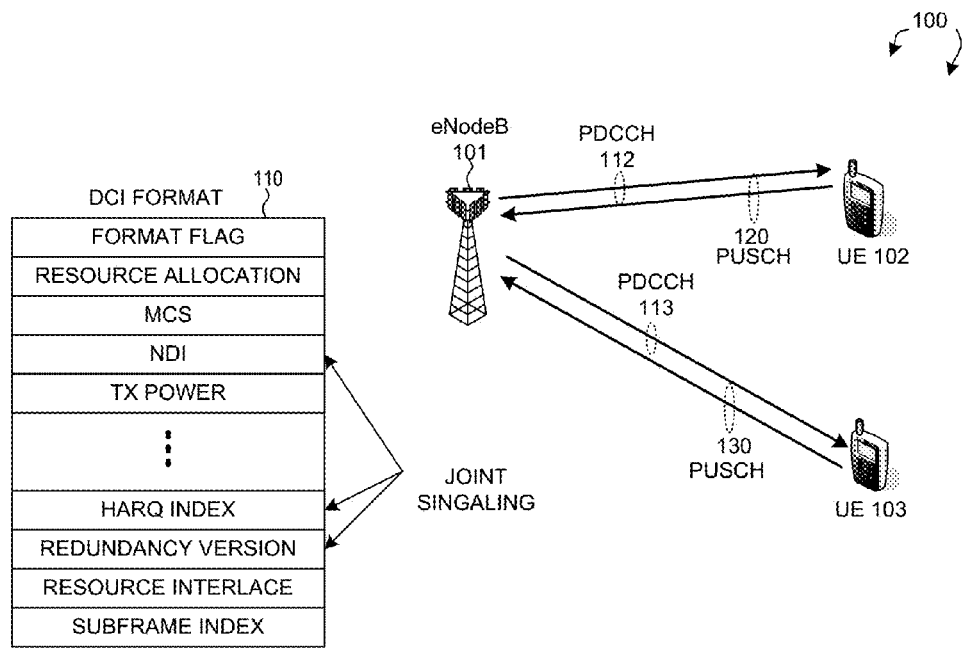
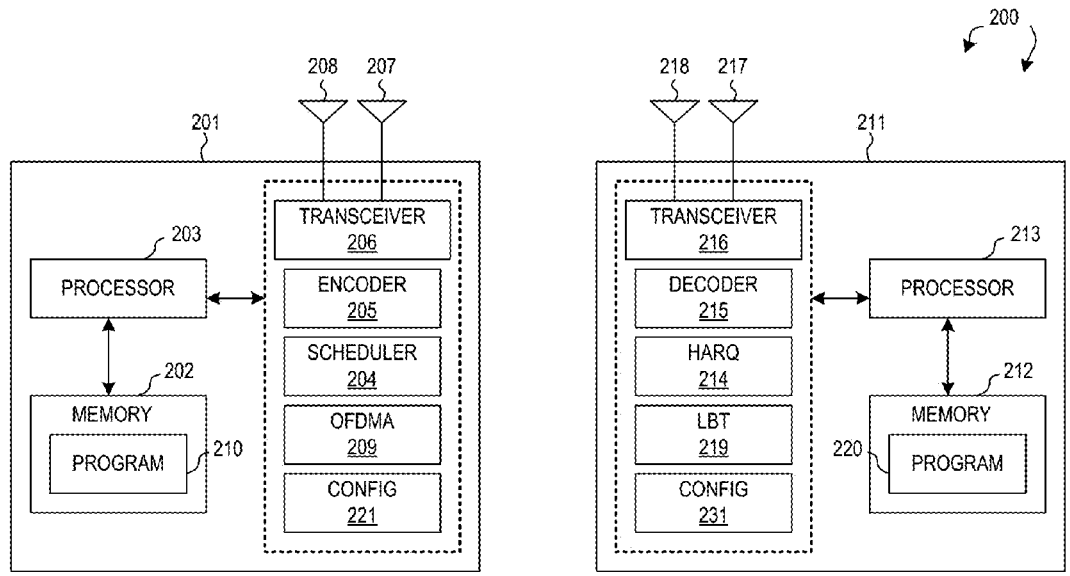

| HARQ PROCESS 1 | HARQ PROCESS 2 | HARQ PROCESS 3 | HARQ PROCESS 4 | HARQ PROCESS 5 | HARQ PROCESS 6 |
|---|---|---|---|---|---|
| NEW DATA (RV0) (INDEX=0) | NEW DATA (RV0) (INDEX=1) | NEW DATA (RV0) (INDEX=2) | NEW DATA (RV0) (INDEX=3) | NEW DATA (RV0) (INDEX=4) | NEW DATA (RV0) (INDEX=5) |
| RV0 (INDEX=6) | RV0 | RV0 | RV0 | RV0 | RV0 |
| RV1 | RV1 | RV1 | RV1 | RV1 | RV1 |
| RV2 | RV2 | RV2 | RV2 | RV2 | RV2 |
| RV3 | RV3 | RV3 | RV3 | RV3 (INDEX=28) | RV3 (INDEX=29) |

FIG. 5

| HARQ PROCESS 1 | HARQ PROCESS 2 | HARQ PROCESS 3 | HARQ PROCESS 4 | HARQ PROCESS 5 | HARQ PROCESS 6 |
|---|---|---|---|---|---|
| NEW DATA (RV0) (INDEX=0) | NEW DATA (RV0) (INDEX=1) | NEW DATA (RV0) (INDEX=2) | NEW DATA (RV0) (INDEX=3) | NEW DATA (RV0) (INDEX=4) | NEW DATA (RV0) (INDEX=5) |
| RV0 (INDEX=6) | RV0 (INDEX=7) | RV0 (INDEX=8) | RV0 (INDEX=9) | RV0 (INDEX=10) | RV0 (INDEX=11) |
| RV1 (INDEX=12) | RV1 (INDEX=13) | RV1 (INDEX=14) | RV1 (INDEX=15) | RV1 (INDEX=16) | RV1 (INDEX=17) |
| RV2 (INDEX=18) | RV2 (INDEX=19) | RV2 (INDEX=20) | RV2 (INDEX=21) | RV2 (INDEX=22) | RV2 (INDEX=23) |
| RV3 (INDEX=24) | RV3 (INDEX=25) | RV3 (INDEX=26) | RV3 (INDEX=27) | RV3 (INDEX=28) | RV3 (INDEX=29) |

SKIPPED: INDEX = 30

FIG. 6

CONTROL CHANNEL DESIGN FOR ELAA

CROSS REFERENCE TO RELATED APPLICATIONS

This application claims priority under 35 U.S.C. § 119 from U.S. Provisional Application No. 62/317,462, entitled "Control Channel Design for eLAA," filed on Apr. 1, 2016; U.S. Provisional Application No. 62/322,313, entitled "Control Channel Design for eLAA," filed on Apr. 14, 2016, the subject matter of which is incorporated herein by reference.

TECHNICAL FIELD

The disclosed embodiments relate generally to wireless network communications, and, more particularly, to control channel design in licensed assisted access (LAA) wireless communications systems.

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use a combination of licensed spectrum and unlicensed spectrum. This solution is referred to as "Licensed Assisted Access" or "LAA". In such a solution, an established communication protocol such as Long Term Evolution (LTE) can be used over the licensed spectrum to provide a first communication link, and LTE can also be used over the unlicensed spectrum to provide a second communication link.

Furthermore, while LAA only utilizes the unlicensed spectrum to boost downlink through a process of carrier aggregation, enhanced LAA (eLAA) allows uplink streams to take advantage of the 5 GHz unlicensed band as well. Although eLAA is straightforward in theory, practical usage of eLAA while complying with various government regulations regarding the usage of unlicensed spectrum is not so straightforward. Moreover, maintaining reliable communication over a secondary unlicensed link requires improved techniques.

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data.

In Rel-14 LAA, uplink grants for a UE in a subframe can enable PUSCH transmission for the UE in multiple subframes for both cross-CC scheduling case and self-scheduling case. For UL transmission in eLAA, flexible timing between the subframe carrying the UL grant and subframes of the corresponding PUSCHs is supported. For the details of UL grant(s) for a UE in a subframe enabling PUSCH transmission for the UE in multiple subframes in LAA, at least the following options are considered. Option 1) Single UL grant in a subframe for a UE can schedule N (N≥1) PUSCH transmissions for the UE in N subframes with single PUSCH per subframe. Option 2) Single UL grant in a subframe for a UE can schedule single PUSCH transmission in a single subframe while UE can receive multiple UL grants in a subframe for PUSCH transmissions in different subframes. Option 3) Single UL grant in a subframe for a UE can enable the UE to transmit single PUSCH transmission among one of the multiple subframes depending on UL LBT result.

The support of Hybrid Automatic Retransmission (HARQ) is an important feature in eLAA. HARQ allows a link to be operated with a tradeoff between throughput and latency as determined by the serving base station. A flexible and efficient PDCCH signaling scheme that schedules PUSCH transmission over multiple subframes with HARQ support is sought.

SUMMARY

A flexible and efficient physical downlink control channel (PDCCH) signaling scheme that schedules physical uplink shared channel (PUSCH) transmission over multiple subframes with Hybrid Automatic Retransmission (HARQ) support is proposed. The PDCCH has a downlink control information (DCI) format that schedules PUSCH transmission over multiple subframes. The PUSCH transmission is associated with multiple HARQ processes with non-consecutive HARQ process IDs. Furthermore, the DCI format uses joint signaling to combine HARQ process indexes, new data indication (NDI), and redundancy version (RV) to reduce signaling overhead.

In one embodiment, a base station transmits an uplink grant over a physical downlink control channel (PDCCH) to a user equipment (UE) in an orthogonal frequency division multiplexing (OFDM) wireless communications network. The base station receives an uplink transmission in response to the uplink grant. The uplink transmission is applied with multiple Hybrid Automatic retransmission (HARQ) processes. The multiple HARQ processes have non-consecutive HARQ process IDs. The base station transmits a downlink control information (DCI). The DCI comprises subsequent uplink grant information for HARQ data retransmission as well as HARQ new data transmission over multiple subframes.

In another embodiment, a user equipment (UE) receives an uplink grant from a base station over a physical downlink control channel (PDCCH) in an orthogonal frequency division multiplexing (OFDM) wireless communications network. The UE transmits uplink data over a physical uplink shared channel (PUSCH) in response to the uplink grant. The PUSCH transmission is applied with multiple Hybrid Automatic retransmission (HARQ) processes. The multiple HARQ processes have non-consecutive HARQ process IDs. The UE decodes a downlink control information (DCI) from the base station. The DCI comprises subsequent uplink grant information for HARQ data retransmission as well as HARQ new data transmission over multiple subframes.

Other embodiments and advantages are described in the detailed description below. This summary does not purport to define the invention. The invention is defined by the claims.

BRIEF DESCRIPTION OF THE DRAWINGS

FIG. 1 illustrates a wireless communications system with physical control channel design in extended licensed assisted access (eLAA) in accordance with a novel aspect.

FIG. 2 is a simplified block diagram of a wireless transmitting device and a receiving device in accordance with a novel aspect.

FIG. 5 illustrates one embodiment of DCI design with joint signaling.

FIG. 6 illustrates another embodiment of DCI design with joint signaling.

DETAILED DESCRIPTION

Figure 3:
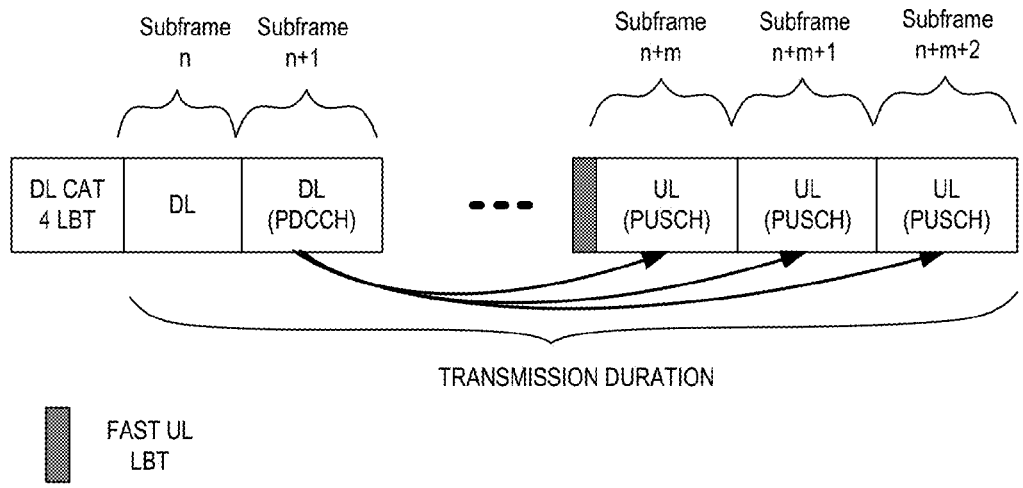
FIG. 3 illustrates one embodiment of PDCCH scheduling for uplink PUSCH transmission over multiple subframes.

Reference will now be made in detail to some embodiments of the invention, examples of which are illustrated in the accompanying drawings.

FIG. 1 illustrates a wireless communications system 100 with physical downlink control channel (PDCCH) design in extended licensed assisted access (eLAA) in accordance with a novel aspect. Mobile communication network 100 is an OFDM/OFDMA system comprising a base station eNodeB 101 and a plurality of user equipments including UE 102 and UE 103. In 3GPP LTE systems based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into physical resource blocks (PRBs), where each PRB consists of 12 consecutive subcarriers in one slot. In one example, the nominal channel bandwidth is 20 MHz, occupied with 100 PRBs of 18 MHz plus guard bands.

When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets an uplink grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including HARQ ACK/NACK, CQI, MIMO feedback, scheduling requests is carried by a physical uplink control channel (PUCCH) or PUSCH if the UE has data or RRC signaling.

Licensed Assisted Access (LAA) has been proposed to meet the exponential increase in communication demand. In LAA, a combination of licensed spectrum and unlicensed spectrum is used. An established communication protocol such as Long Term Evolution (LTE) can be used over the licensed spectrum to provide a first communication link, and LTE can also be used over the unlicensed spectrum to provide a second communication link. Furthermore, while LAA only utilizes the unlicensed spectrum to boost downlink through a process of carrier aggregation, enhanced LAA (eLAA) allows uplink streams to take advantage of the 5 GHz unlicensed band as well.

For UL transmission in eLAA, one or more uplink grant for a UE in a subframe can enable PUSCH transmission for the UE in multiple subframes. Furthermore, flexible timing between the subframe carrying the UL grant and subframes of the corresponding PUSCH transmission is supported. The support of Hybrid Automatic retransmission (HARQ) is also an important feature in eLAA. HARQ allows a link to be operated with a tradeoff between throughput and latency as determined by the base station. In accordance with one novel aspect, a flexible and efficient PDCCH signaling scheme that schedules PUSCH transmission over multiple subframes with HARQ support is proposed. The PDCCH has a DCI format that schedules PUSCH transmission in multiple subframes. The PUSCH transmission is associated with multiple HARQ processes with non-consecutive HARQ indexes. Furthermore, the DCI format uses joint signaling to combine information including HARQ process indexes, new data indication (NDI), and redundancy version (RV) to reduce signaling overhead.

In the example of FIG. 1, eNodeB 101 transmits PDCCH 112 to UE 102 and PUSCH 120 is allocated for UE 102 for uplink transmission. Similarly, eNodeB 101 transmits PDCCH 113 to UE 103 and PRACH 130 is allocated for UE 102 for uplink transmission. In one advantageous aspect, the PDCCH carries DCI to schedule PUSCH transmission over multiple subframes that is associated with multiple HARQ processes with non-consecutive HARQ indexes. Typically, the DCI carried by the PDCCH comprises a format flag, a frequency hopping flag, resource allocation, MCS, NDI, TX power control, cyclic shift for DMRS, CSI request, SRS request, resource allocation type, and CRC. For multiple subframe PUSCH transmission, additional information is needed including HARQ indexes and redundancy version, resource interlace allocation for PUSCH, and uplink subframe index, as depicted by 110. Furthermore, new data indication (NDI), HARQ index, and redundancy version can be jointly signaled to reduce overhead.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a scheduler 204, an OFDMA module 209, and a configuration circuit 221. Wireless device 211 is a receiving device that includes a decoder 215, a HARQ circuit 214, an LBT circuit 219, and a configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, the transmitting device (a base station) configures radio resource (PUSCH) for UEs via configuration circuit 221, schedules downlink and uplink transmission for UEs via scheduler 204, encodes data packets to be transmitted via encoder 205 and transmits OFDM radio signals via OFDM module 209. The receiving device (a user equipment) obtains allocated radio resources for PUSCH via configuration circuit 231, receives and decodes downlink data packets via decoder 215, and performs uplink transmission and retransmission with HARQ via HARQ circuit 214 after successfully gain the channel access via LBT circuit 219.

To facilitate efficient and fair spectrum sharing, a dynamic spectrum sharing mechanism called listen-before-talk (LBT) is supported based on regulation rules in each country. However, the performance of LAA with LBT mechanism may not satisfy the purpose of efficient and fair spectrum sharing. A maximum channel occupancy time (MCOT) including DL transmission from one eNB and UL transmission to the same eNB is thus introduced. A transmission sequence is defined as a number of subframes including possible partial subframes for DL and/or UL within a MCOT. The transmission in the first subframe among the transmission sequence is conducted after a Category 4 LBT. The node performing the Category 4 LBT can be either an eNB or a UE. A sequence of transmission including DL and/or UL can follow the transmission on the first subframe. The transmission sequence within the MCOT can be initiated by either a DL transmission or an UL transmission. The duration of a transmission sequence is called transmission duration. After the first subframe in a transmission sequence, LBT for another transmission should be faster compared to the Category 4 LBT, e.g., fast DL LBT and/or fast UL LBT.

FIG. 3 illustrates one embodiment of PDCCH scheduling for uplink PUSCH transmission over multiple subframes. In the example of FIG. 3, a transmission sequence is initiated with a downlink transmission. After the first subframe in the transmission sequence, the LBT procedure for another transmission within the same transmission duration should be fast (e.g., Category 2 LBT) as compared to the downlink Category 4 LBT. In FIG. 3, the transmission on the first subframe n of the transmission sequence is for DL after performing the downlink Category 4 LBT, the transmission on the second subframe n+1 of the transmission sequence is for DL without LBT, and a fast UL LBT such as a one shot CCA can be used in the switch from DL transmission to UL transmission. When a UE is granted uplink transmission in consecutive subframes and when all of them are within the maximum transmission duration, it is enough for the UE to perform fast LBT on the first UL subframe (Subframe n+m), and forgo LBTs on the rest of them. Furthermore, subframe n+1 is for DL PDCCH and contains uplink grant for the subsequent PUSCH transmission over multiple subframes, e.g., subframe n+m, n+m+1, and n+m+2. Each of the uplink subframes is associated with an HARQ process with an HARQ indexes that are not necessarily consecutive.

Figure 4:
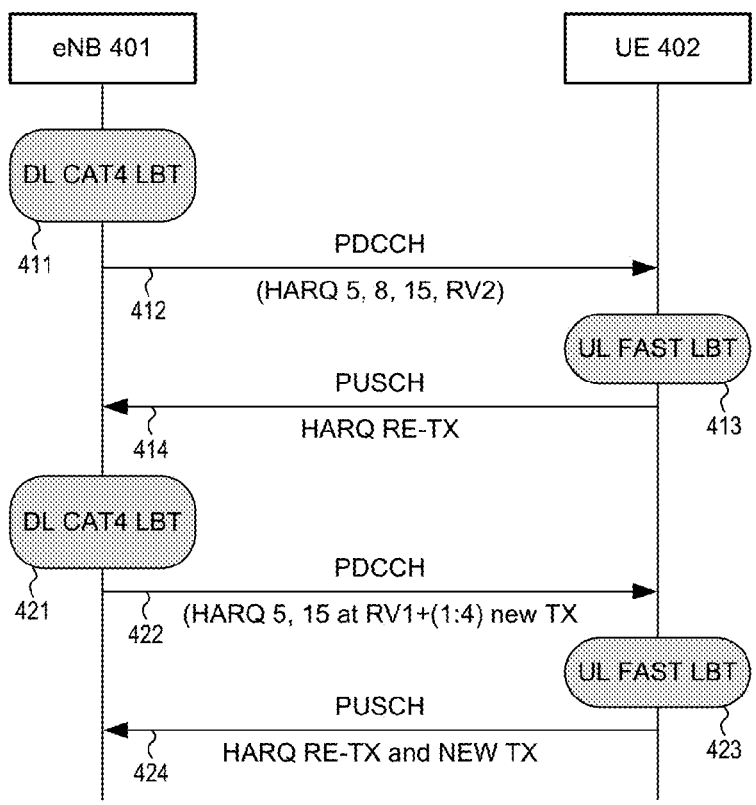
FIG. 4 illustrates a sequence flow between a base station and a user equipment for PUSCH resource allocation with HARQ in eLAA.

FIG. 4 illustrates a sequence flow between a base station 401 and a user equipment UE 402 for PUSCH transmission with HARQ in eLAA. In step 411, eNB 401 performs a DL category 4 LBT procedure to gain DL channel access. Upon successful LBT, in step 412, eNB 401 transmits a PDCCH with DCI to UE 402 for PUSCH transmission. The DCI contains uplink grant including HARQ process indexes and redundancy version for HARQ re-transmission. For example, HARQ processes with indexes 5, 8, 15, and RV=2. In step 413, UE 402 performs an UL fast LBT procedure. Upon successful LBT, in step 414, UE 402 performs HARQ re-transmission over multiple subframes using HARQ process 5, 8, 15 and RV=2. Similarly, in step 421, eNB 401 performs a DL category 4 LBT procedure to gain DL channel access. Upon successful LBT, in step 422, eNB 401 transmits a PDCCH with DCI to UE 402 for PUSCH transmission. The DCI contains uplink grant including HARQ process indexes and redundancy version for HARQ re-transmission as well as new data transmission. For example, HARQ processes with indexes 5, 15, RV=1, and (1:4) new data transmission. In step 423, UE 402 performs an UL fast LBT procedure. Upon successful LBT, in step 424, UE 402 performs HARQ re-transmission over multiple subframes using HARQ process 5, 15 and RV=1 as well as new data transmission.

FIG. 5 illustrates one embodiment of a DCI design with joint signaling. In accordance with one novel aspect, new data indication (NDI), HARQ index, and redundancy version (RV) carried in a DCI format can be jointly signaled. In the example of FIG. 5, there are five states for a HARQ process: New data, RV=0 (retransmission), RV=1 (retransmission), RV=2 (retransmission), and RV=3 (retransmission). Redundancy version (RV) 0 is assumed for a new data. The same HARQ process with "New data" is an implicit acknowledgement that the previous transmission on the same HARQ process is successful, the new transmission takes a MCS level from 0~28 as indicated in the DCI. If the eNB does not schedule further uplink transmission on the same HARQ process for the UE, a code state with the value for the MCS level at 29, 30 or 31 can be used with "New data" to acknowledge a previous transmission with giving a new UL grant. Furthermore, "Uplink subframe index" can take the meaning that "0" is for uplink transmission in subframe n+4, and "1" is for uplink transmission in subframe n+5. Instead of introducing a new field in the DCI format, another way to signal "Uplink subframe index" is to use masks over the CRC e.g. [0000 0000 0000 0000], [1111 0000 1111 0000] etc. If HARQ (Incremental redundancy) is supported, then DCI can signal NDI, HARQ process index and redundancy version jointly as shown in FIG. 5.

If jointly signal HARQ process index, redundancy version and subframe index, the total number of code states is given by $$\sum_{n=1}^{N_t} \binom{N_{state}N_{max}}{n}\binom{N_t}{n}$$

Where $N_{state}$ is the number of states including "New Data" and redundancy version, $N_{max}$ is the maximum number of HARQ processes supported for an eLAA UL carrier, $N_t$ is the maximum of suframes which can be scheduled by one DCI.

Note that non-contiguous subframes scheduled in one DCI is allowed. For example, when $N_t=3$, two granted subframes can be subframes {k, k+1}, {k+1, k+2}, or {k, k+2}, subframe k is a reference timing say k=n+4. If only contiguous subframes can be scheduled in one DCI, then the number of code states can be reduced.

There is no simple way to acknowledge the previous HARQ transmissions: if HARQ bundling is not used, then each previously used HARQ process needs to be acknowledged separately. As a result, the physical channel design for PHICH can be revived for uplink HARQ acknowledgement and a new design is also necessary. First an Nack from PHICH does not trigger a retransmission as asynchronous HARQ is used eLAA. Second the PHICH resource to acknowledge an HARQ transmission is determined according to the resource interlace (e.g. the lowest resource interlace index), DMRS cyclic shift and timing the PUSCH transmission (e.g. subframe index of PUSCH transmission, or a relative timing with respect to a reference).

FIG. 6 illustrates another embodiment of DCI design with joint signaling of NDI, HARQ process index and redundancy version. In the example of FIG. 6, it is shown that there are five states for a HARQ process: New data, RV=0 (retransmission), RV=1 (retransmission), RV=2 (retransmission), RV=3 (retransmission). Redundancy version (RV) 0 is assumed for a new data. The same HARQ process with "New data" is an implicit acknowledgement that the previous transmission on the same HARQ process is successful, the new transmission takes a MCS level from 0~28 as indicated in the DCI. If the eNB does not schedule further uplink transmission on the same HARQ process for the UE, a code state with the value for the MCS level at 29, 30 or 31 can be used with "New data" to acknowledge a previous transmission with giving a new UL grant. For example, if 4 HARQ processes are scheduled by one DCI: HARQ process 1 with a new data, HARQ process 4 with retransmission at redundancy version 2, HARQ process 2 with a retransmission at redundancy version 3, HARQ process 6 with retransmission at redundancy version 3, then we can signal 0, 21, 25, 29 to the UE.

In general, if there are H HARQ processes at maximum at one cell, then there are N=4×H+H code states for each subframe, 4'H is for the 4 redundancy versions at all the HARQ processes, and H is for NDI at H HARQ processes. If non-contiguous transmission is supported (e.g. subframes 1, 2, 4 are scheduled and subframe 3 is skipped), then the number of code states at a subframe can be increased to N=5×H+1, where "1" is for "skipped scheduling". An illustration is given in FIG. 6, when "skipped scheduling" is jointly encoded with NDI, HARQ process index, and redundancy version. With the example above, then we can signal $0 \times N^3+21 \times N^2+25 \times N+29$ to the UE, which incorporates all the information to determine HARQ process index, redundancy version, NDI and scheduling timing.

Figure 7:
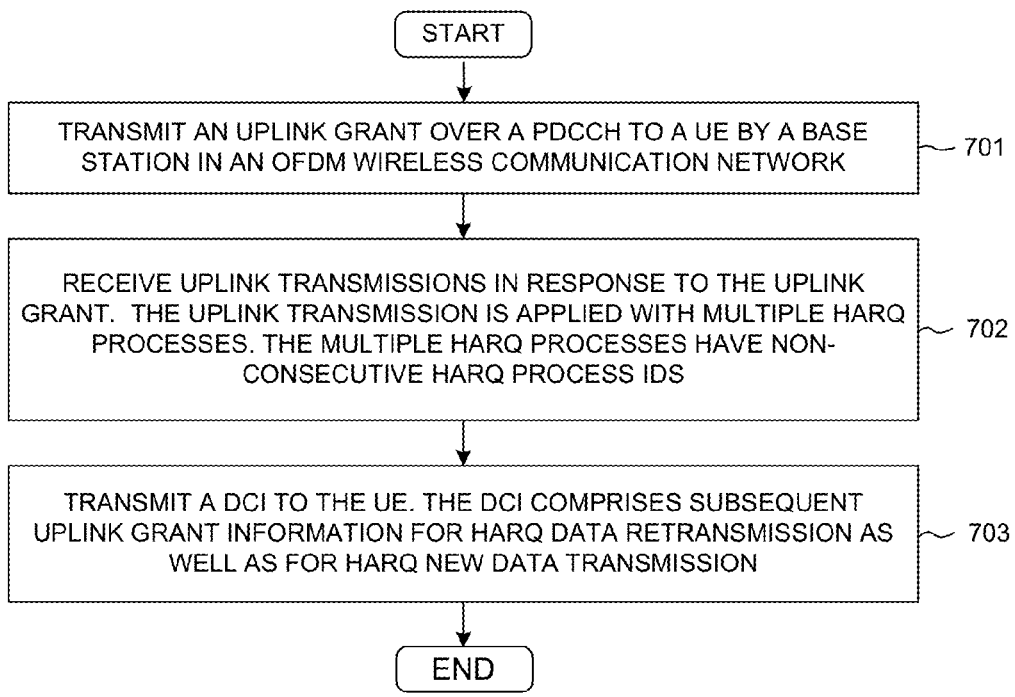
FIG. 7 is flow chart of a method of DCI design for PUSCH transmission with HARQ from base station perspective in eLAA in accordance with one novel aspect.

FIG. 7 is flow chart of a method of DCI design for PUSCH transmission with HARQ from base station perspective in eLAA in accordance with one novel aspect. In step 701, a base station transmits an uplink grant over a physical downlink control channel (PDCCH) to a user equipment (UE) in an orthogonal frequency division multiplexing (OFDM) wireless communications network. In step 702, the base station receives an uplink transmission in response to the uplink grant. The uplink transmission is applied with multiple Hybrid Automatic retransmission (HARQ) processes. The multiple HARQ processes have non-consecutive HARQ process IDs. In step 703, the base station transmits a downlink control information (DCI). The DCI comprises subsequent uplink grant information for HARQ data retransmission as well as HARQ new data transmission over multiple subframes.

Figure 8:
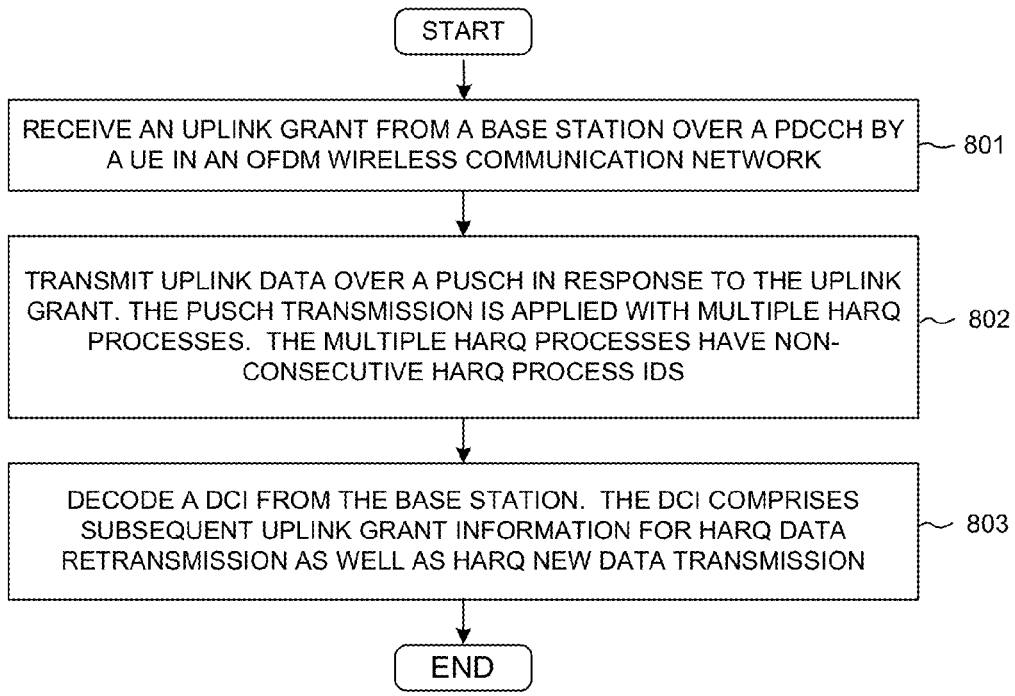
FIG. 8 is a flow chart of a method of DCI design for PUSCH transmission with HARQ from UE perspective in eLAA in accordance with one novel aspect.

FIG. 8 is a flow chart of a method of DCI design for PUSCH transmission with HARQ from UE perspective in eLAA in accordance with one novel aspect. In step 801, a user equipment (UE) receives an uplink grant from a base station over a physical downlink control channel (PDCCH) in an orthogonal frequency division multiplexing (OFDM) wireless communications network. In step 802, the UE transmits uplink data over a physical uplink shared channel (PUSCH) in response to the uplink grant. The PUSCH transmission is applied with multiple Hybrid Automatic retransmission (HARQ) processes. The multiple HARQ processes have non-consecutive HARQ process IDs. In step 803, the UE decodes a downlink control information (DCI) from the base station. The DCI comprises subsequent uplink grant information for HARQ data retransmission as well as HARQ new data transmission over multiple subframes.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
transmitting an uplink grant over a physical downlink control channel (PDCCH) to a user equipment (UE) by a base station in an orthogonal frequency division multiplexing (OFDM) wireless communications network;
receiving an uplink transmission in response to the uplink grant, wherein the uplink transmission is applied with multiple Hybrid Automatic retransmission (HARQ) processes, and wherein the multiple HARQ processes have non-consecutive HARQ process IDs; and
transmitting a downlink control information (DCI), wherein the DCI comprises subsequent uplink grant information for HARQ data retransmission as well as HARQ new data transmission over multiple subframes.

2. The method of claim 1, wherein the DCI comprises resource allocation, modulation and coding scheme (MCS), new data indication (NDI), and transmit power information.

3. The method of claim 2, wherein the DCI further comprises HARQ process IDs, redundancy versions (RVs), resource interlace allocation information, and uplink subframe index information.

4. The method of claim 3, wherein the NDI, the HARQ process IDs, and the RVs are jointly signaled with a reduced number of bits.

5. The method of claim 4, wherein a single index number is created to independently signal a corresponding NDI, a corresponding HARQ process ID, and a corresponding RV.

6. The method of claim 3, wherein the DCI also indicates that the multiple subframes are contiguous.

7. The method of claim 3, wherein the DCI also indicates that the multiple subframes are non-contiguous, and the non-contiguous subframes are jointly signaled with the NDI, the HARQ process IDs, and the RVs.

8. A method, comprising:
   receiving an uplink grant from a base station over a physical downlink control channel (PDCCH) by a user equipment (UE) in an orthogonal frequency division multiplexing (OFDM) wireless communications network;
   transmitting uplink data over a physical uplink shared channel (PUSCH) in response to the uplink grant, wherein the PUSCH transmission is applied with multiple Hybrid Automatic retransmission (HARQ) processes, and wherein the multiple HARQ processes have non-consecutive HARQ process IDs; and
   decoding a downlink control information (DCI) from the base station, wherein the DCI comprises subsequent uplink grant information for HARQ data retransmission as well as HARQ new data transmission over multiple subframes.

9. The method of claim 8, wherein the DCI comprises resource allocation, modulation and coding scheme (MCS), new data indication (NDI), and transmit power information.

10. The method of claim 9, wherein the DCI further comprises HARQ process IDs, redundancy versions (RVs), resource interlace allocation information, and uplink subframe index information.

11. The method of claim 10, wherein the NDI, the HARQ process IDs, and the RVs are jointly signaled with a reduced number of bits.

12. The method of claim 11, wherein a single index number is created to independently signal a corresponding NDI, a corresponding HARQ process ID, and a corresponding RV.

13. The method of claim 10, wherein the DCI also indicates that the multiple subframes are contiguous.

14. The method of claim 10, wherein the DCI also indicates that the multiple subframes are non-contiguous, and the non-contiguous subframes are jointly signaled with the NDI, the HARQ process IDs, and the RVs.

15. A user equipment (UE), comprising:
   a receiver that receives an uplink grant from a base station over a physical downlink control channel (PDCCH) in an orthogonal frequency division multiplexing (OFDM) wireless communications network;
   a transmitter that transmits uplink data over a physical uplink shared channel (PUSCH) in response to the uplink grant, wherein the PUSCH transmission is applied with multiple Hybrid Automatic retransmission (HARQ) processes, and wherein the multiple HARQ processes have non-consecutive HARQ process IDs; and
   a decoder that decodes a downlink control information (DCI) from the base station, wherein the DCI comprises subsequent uplink grant information for HARQ data retransmission as well as HARQ new data transmission over multiple subframes.

16. The UE of claim 15, wherein the DCI comprises resource allocation, modulation and coding scheme (MCS), new data indication (NDI), and transmit power information.

17. The UE of claim 16, wherein the DCI further comprises HARQ process IDs, redundancy versions (RVs), resource interlace allocation information, and uplink subframe index information.

18. The method of claim 17, wherein the DCI also indicates that the multiple subframes are contiguous.

19. The method of claim 17, wherein the DCI also indicates that the multiple subframes are non-contiguous, and the non-contiguous subframes are jointly signaled with the NDI, the HARQ process IDs, and the RVs.

20. The method of claim 17, wherein the NDI, the HARQ process IDs, and the RVs are jointly signaled with a reduced number of bits.

21. The method of claim 20, wherein a single index number is created to independently signal a corresponding NDI, a corresponding HARQ process ID, and a corresponding RV.

* * * * *